United States Patent [19]

Melnyk

[11] Patent Number: 4,560,929
[45] Date of Patent: Dec. 24, 1985

[54] POSITION DETECTOR APPARATUS AND METHOD UTILIZING DAMPED OSCILLATIONS

[75] Inventor: George Melnyk, Endicott, N.Y.

[73] Assignee: International Business Machines Corporation, Armonk, N.Y.

[21] Appl. No.: 485,523

[22] Filed: Apr. 15, 1983

[51] Int. Cl.⁴ .................. G01B 7/14; G01N 27/00; G08B 19/00
[52] U.S. Cl. .................. 324/207; 331/65
[58] Field of Search .............. 324/207, 208, 236; 331/65, 165

[56] References Cited

U.S. PATENT DOCUMENTS

| | | | |
|---|---|---|---|
| 4,075,563 | 2/1978 | Battle | 324/236 |
| 4,446,427 | 5/1984 | Lavrenich | 324/207 |

Primary Examiner—Gerard R. Strecker
Assistant Examiner—Walter E. Snow
Attorney, Agent, or Firm—John S. Gasper

[57] ABSTRACT

Apparatus for sensing the position of an electrically conductive printing band in which the band moves at varying depths within the gap of an inductor in an inductor-capacitor resonance circuit that is periodically energized to induce eddy currents in the band. The oscillatory ringing resulting from pulsing the tank circuit decays at a rate that varies with the magnitude of the induced eddy current and, hence, the depth of the band in the gap. By counting the number of voltage excursions across the tank circuit resulting from an excitation that exceed a predetermined threshold during decay, the position of the band can be deduced. Corrective positioning may thereafter be undertaken.

14 Claims, 4 Drawing Figures

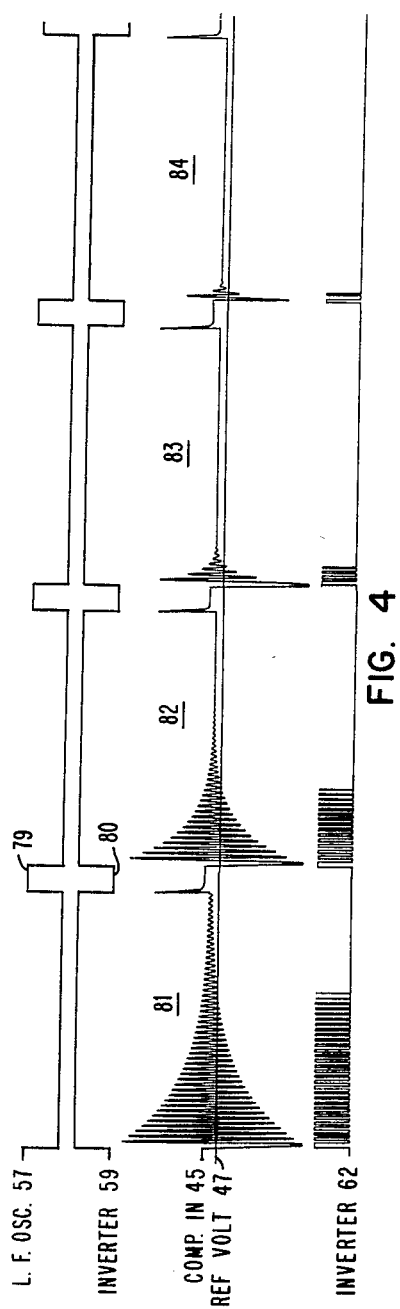
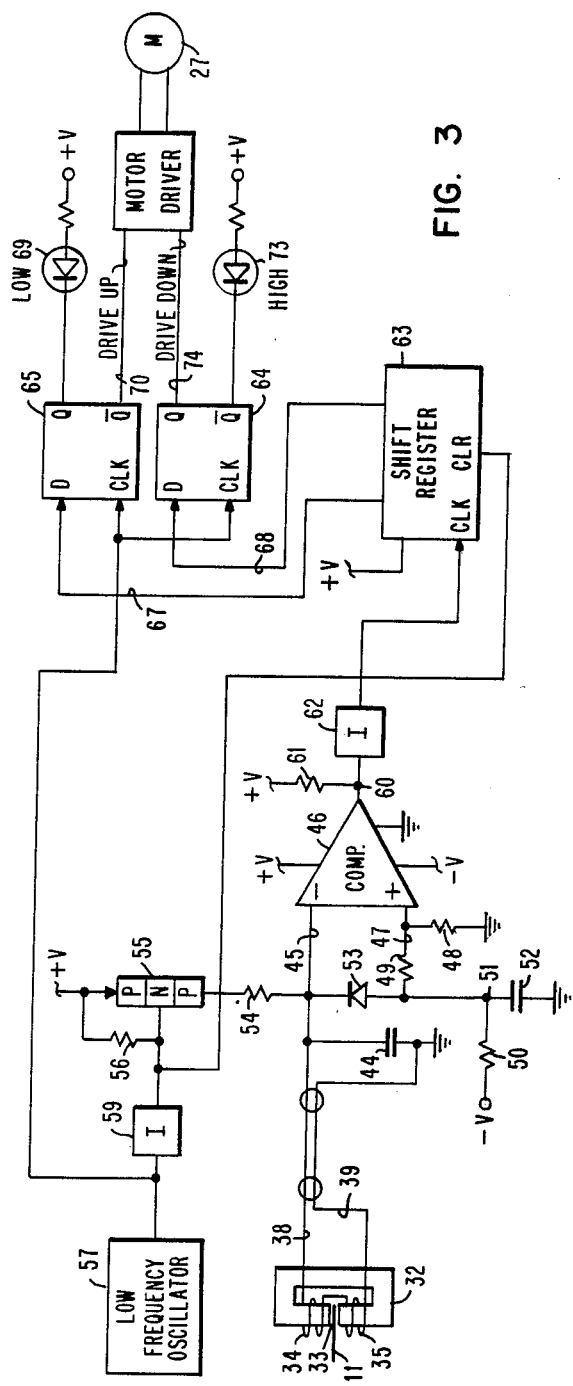
FIG. 4
FIG. 3

POSITION DETECTOR APPARATUS AND METHOD UTILIZING DAMPED OSCILLATIONS

BACKGROUND OF THE INVENTION

This invention relates generally to proximity detectors and more particularly to a detector for determining the lateral position of a conductive band moving along a path within the magnetic field of an inductor.

In a belt or band type of high speed printer, a metal band having on its surface embossed or etched characters is driven continuously about a driving pulley and driven idler. Along one linear portion of the path on one side of the band is a platen and adjacent the opposite side of the band at that location are a reversible, transversely moving ribbon, a recording medium of paper and a plurality of selectively energizable hammers that impact the paper and ribbon against type characters that are in turn pushed against the platen. Correct positioning of the band is important to good print registration.

When several of the hammers are energized concurrently or nearly so there is a momentary urging by the movement of the ribbon tending to slightly displace the band transversely of its path. Since the band moves at high speed and several impacts are required to fill the line of print, the print registration varies considerably resulting in poor appearance. Band wear also contributes to the band tracking problem.

The bands can be interchanged in this type of printer to permit replacement or the use of different type fonts. Although the bands are manufactured to close tolerances, the band dimensions, mounting stresses and repeated impacts are not exactly the same so that different bands do not track in exactly the same path.

Manual adjustments are typically provided to enable band correction by the user. Although such corrections can be done in the latter instance of changing bands, it is frequently time consuming. Accordingly, automatic adjustment is highly desirable and such adjustments should be made to correct misalignments on the order of 0.1 to 0.2 millimeters of deviation from the band path. Optical and Hall or magnetoresistive devices have been tried for sensing band position, but these require expensive components or material and are unstable due to dirt, magnetic characteristics of the band, or dimensional change.

One known technique for sensing the position of a character band is that shown in an article by E. F. Helinski entitled "Belt Edge Detector" in the IBM Technical Disclosure Bulletin, Vol. 23, No. 8, January, 1981, pages 3641-3. With this technique the band moves within the gap of a magnetic core having a pair of windings. One winding, serving as a transmitting coil is energized with a high frequency signal and the other winding, serving as the receiving coil, is tapped to permit picking off the induced voltage. As the band position moves transversely of its normal path farther into or out of the gap of the transducer, the sensed voltage correspondingly decreases or increases. The magnitude of the induced signal, apparently influenced by eddy currents induced in the band, is compared with calibrated threshold values to indicate the amount of displacement from the band's desired position. This method has the disadvantage of being useful and reliable only for changes in position of 0.6 to 0.8 mm. These changes are greater than can be tolerated for acceptable printing registration.

An alternative detection scheme, shown in U.S. Pat. No. 3,735,229, is similar but, again, does not have the required sensitivity. In this servo system arrangement, an oscillator periodically energizes a resonant tank circuit of inductor and capacitor. A portion of a movable conductive metal element lies within the inductor and has eddy currents induced therein. The eddy currents effect a reduction of the energy available to the tank circuit thus affecting the rate of decay of the tank circuit oscillations. Constant integration of the voltage across the tank circuit provides an indication of the element's position. The integrated voltage is compared with a threshold and an error signal energizes the servo to change element position. This technique, while insensitive to the accumulation of debris, is inadequate to sense the small changes required for controlling a printer band location. By integrating the oscillating tank circuit voltage there is permitted a relatively large variation that is also sensitive to voltage supply and temperature changes. Further, the integration requires the currents of several cycles of operation to indicate reliably the element's position.

OBJECTS AND SUMMARY OF THE INVENTION

It is accordingly a primary object of this invention to provide position sensing apparatus for a moving element having the capability of detecting smaller changes in position and with greater accuracy.

It is another important object of this invention to provide position detecting apparatus that performs with greater reliability under adverse environmental conditions of temperature change and debris and with wider variations in voltage supply.

Yet another important object of this invention is to provide position sensing apparatus for a moving element which incorporates a pumped inductor-capacitor tank circuit in which the moving element serves as an eddy current member at the inductor and the position of the element is measured by counting the oscillations of the tank circuit during each energization cycle.

The foregoing objects are attained in accordance with the invention by providing a stationary magnetic core having a gap through which a conductive band moves. The core has an inductor wound thereon that together with a parallel capacitor forms a tank circuit. Energizing means periodically excite the tank circuit to oscillation and the inductor induces eddy currents in the band in amounts that vary with the distance the band extends within the gap. The rate of energy removal from the tank circuit, due to the eddy currents, directly affects the rate of decay of the oscillations and means then count the number of oscillatory excursions during each excitation that exceed a preset threshold value. Means responsive to predetermined count values are operable to adjust the position of the band.

The circuit arrangement of this invention has the advantage of rapid determination of the band position since the position is known from the resulting count at the end of each energization. The count thus provides easily adapted digital signals for use in subsequent circuits. Stability and accuracy over a wide range of band movement enhance the reliability, and the changes in supply voltage, temperature and dust are substantially ineffective to alter the reliability of the detection circuit. The circuit is very insensitive to the absolute frequency of the damped wave form since only a particular count and not the time in which the count occurs is of primary importance. This allows a broad range of manufacturing tolerances while still maintaining a high degree of accuracy and stability from the circuit.

The foregoing and other objects, features and advantages of the invention will be apparent from the following more particular description of a preferred embodiment of the invention as illustrated in the accompanying drawing.

BRIEF DESCRIPTION OF THE DRAWING

FIG. 3 is a diagram of a circuit used for controlling the magnetic transducer and position of the type band of FIG. 1; and FIG. 4 is a diagram of voltage waveforms occurring in the circuit of FIG. 3.

DESCRIPTION OF THE PREFERRED EMBODIMENT

Figures 1, 2:
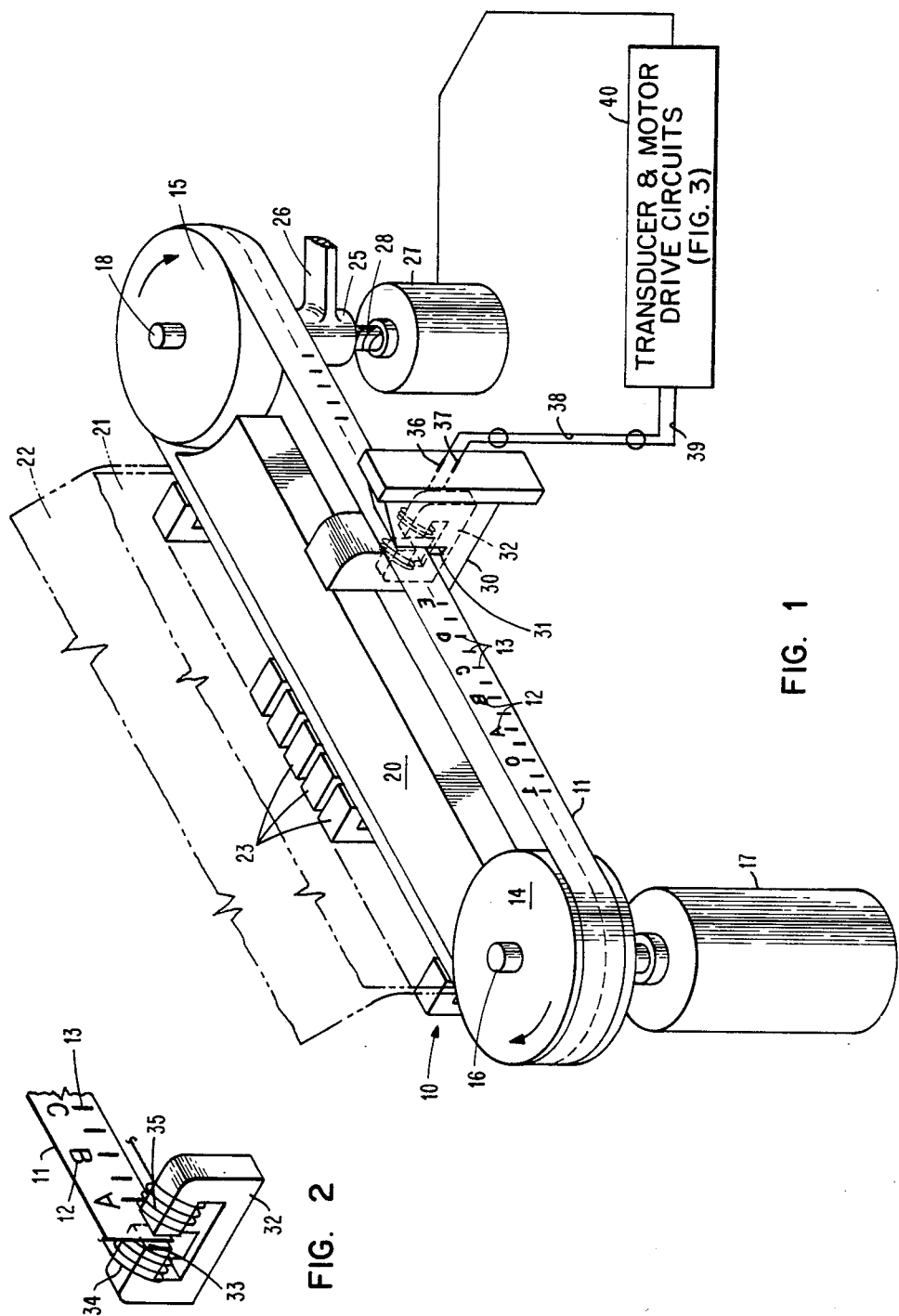
FIG. 1 is a perspective view of a printer incorporating the subject matter of the present invention.
FIG. 2 is a diagrammatic enlarged view, partly in section, illustrating the positional relationship of the type band and magnetic transducer shown in FIG. 1.

Referring to FIG. 1, there is shown a printing mechanism, indicated generally as 10, for which this invention is particularly well suited. Mechanism 10 comprises generally a moving metal band or belt 11, typically of stainless steel, having type characters 12 and timing marks 13 embossed or etched thereon; the band is supported for rotation about a driving pulley 14 and a driven pulley 15. Pulley 14 is fixed on motor shaft 16 and rotated by motor 17. Idler pulley 15 is freely rotatable about shaft 18. Adjacent one side of band 11 between pulleys 14 and 15 lies a platen 20. Opposite the platen and adjacent the outside surface of band 11 is a vertically movable ribbon 21 and recording medium such as paper web 22, both shown in phantom. Beyond the paper web are a plurality of selectively energizable hammers 23 that can be actuated to impact the paper web 22 against ribbon 21, band 11 and the band, in turn, against platen 20.

The impacts of the several hammers create an impression of the selected characters on the recording medium. The hammers are energized at appropriate times to produce an impression of the selected character as it comes into position while the band rotates continuously along its path. Ribbon 21 is reversible and moves continuously in one direction or the other during printing. As the hammers impact the paper web 22 against the ribbon and, in turn, against the band, the band tends to follow the direction of the ribbon.

Vertical band position is determined by the vertical location of threaded support sleeve 25 that is fixedly attached to an arm 26. The arm is vertically yieldable relative to a fixed support not shown. A reversible step motor 27 having a threaded shaft 28 engaging the threads of sleeve 25 is able upon rotation to move sleeve 25 either up or down depending upon the rotation of the step motor. A corresponding vertical change occurs in the position of pulley 15. The surface of this pulley is crowned and band 11 tries to follow the position change. By making the surface of drive pulley 14 flat, band 11 readily moves to the new vertical position.

The type band position is monitored by a transducer in housing 30 that has a slot 31 through which band 11 continuously moves during its normal operation. The housing has embedded therein magnetic core 32, seen more clearly in FIG. 2, having a gap 33 coincident with slot 31. The core has a pair of windings 34, 35 one on each core leg, to generate a magnetic flux field when energized. The windings are connected in series with their other leads connected to terminals 36, 37 in FIG. 1 that are, in turn, connected through leads 38, 39 of a shielded cable to transducer and motor drive circuits 40. Housing 30 is preferably molded of a non-conductive plastic and attached to a fixed support, not shown. The opening of transducer gap 31 is approximately five to seven times the thickness of band 11. For example, if a band is 0.15 mm. thick then the gap is about 1.1 mm.

A circuit for the transducer and motor drive is illustrated in detail in FIG. 3. Magnetic core 32 has windings 34 and 35 thereon connected through leads 38, 39 in the form of a shielded cable to parallel capacitor 44. The capacitor and windings form a resonant tank circuit. Lead 39 is connected to ground and lead 38 is connected to the inverting input 45 of comparator circuit 46, such as a differential amplifier. Non-inverting input 47 of the comparator is connected to ground through resistor 48 and to a negative voltage supply through resistors 49 and 50 with junction 51 of the latter resistors tied to ground through capacitor 52. Junction 51 is connected through diode 53 to inverting terminal 45 and to resistor 54. The opposite end of resistor 54 is coupled to the collector of transistor 55 whose emitter is connected to a positive voltage supply and tied through resistor 56 to its base. Transistor 55 is controlled through a low frequency oscillator circuit 57 that is settable to turn on at intervals such as 1.5 msec. for about 50 usec. The output of oscillator 57 is fed to inverter 59 which controls the base of transistor 55.

During the interval that timer 57 turns on transistor 55, there is conduction through resistor 54, conductor 38, windings 34 and 35 to conductor 39 to ground. When transistor 55 turns off, the energy stored in the coils 34 and 35 will oscillate with the capacitor 44. The amplitude of the first negative cycle will be clamped to the negative supply limiting the magnitude of this excursion thus insuring that each energization of a tank circuit continues oscillation from the same negative level. This assures that the remaining cycles in the damped wave have the same energy each time the tank is pumped regardless of variations in the tank drive transistor and positive power supply. The negative voltage that determines the clamp level also provides the reference voltage for the comparator 46. This compensates for variations in the negative power supply by having the comparator reference track with the clamping level. This arrangement adds to the stability and accuracy of the circuit.

The output terminal 60 of comparator 46 is connected across resistor 61 to a positive voltage supply and to the input of inverter 62. The inverter output supplies counting pulses to shift register 63 operating as a count accumulator. The shift register is appropriately connected to supply voltages and is cleared via the output of inverter 59, or each time transistor 55 is turned on.

A count pulse is supplied to shift register 63 from inverter 62 each time the voltage level at inverting terminal 45 of the comparator becomes more negative than the reference voltage at non-inverting terminal 47. The number of count pulses per tank circuit energization will depend on the eddy current loses resulting from the band position in gap 33 of core 32.

The depth at which the band moves within gap 33 will be indicated by the count residing in shift register 63 for a tank circuit energization. This count can be selected to actuate a control circuit to adjust the vertical position of the idler pulley 15 in FIG. 1. In the circuits shown in FIG. 3, two counts are selected as control counts by tapping those desired counts at the outputs of shift register 63 and using the values to define a "window" at which the band is properly positioned. Counts outside this window will result in a correction of the idler pulley position. For example, line 67 controlling the conditioning level for latch 65 may be set at a count of ten while line 68 serving as a conditioning input for latch 64 may be set at a count of twelve. During a cycle of operation if ten counts were not detected then neither line 67 or 68 will be on and during occurrence of clock time at the next pulse from oscillator 57 both latches will be set off. Indicator light 69, which may be a light emitting diode, will have a sufficient potential across it to indicate the band is low hence the count is low. Accordingly, the signal on line 70 is supplied as a "drive up" signal to motor driver 71 to energize motor 27.

If the count at shift register 63 is assumed to reach a count of ten but not twelve, then line 67 will condition latch 65 to turn on at the next oscillator signal thus turning off indicator 69 and removing the drive signal from motor driver 71. Since shift register 63 did not reach a count of twelve, the signal on line 68 remains such as to condition latch 64 to remain off thus preventing indicator 73 from turning on. Since latch 64 is off there is no drive signal on line 74 to motor driver 71. However, in the the instance that the count is sufficiently high that the voltages on line 67 and 68 are sufficient to condition both latches to turn on, the signal on line 74 will provide a "drive down" signal to motor driver 71 and indicator 73 will be turned on to indicate that the band is too high. It will be noted from the foregoing that the "window" can be set as desired to give a range of control over the band position. Although a count accumulator has been shown as a shift register to simplify decoding, other types of counters can be used to accumulate the count values. It will also be noted that the band position can be easily changed by a circuit presetting base count values in the count accumulating device at the time of clearing. The presetting of values permits easy adjustment by an operator to compensate for different or worn bands.

The voltage wave forms in FIGS. 4a–4d illustrate the activating signals and the resulting oscillations and count signals for different positions of band 11. In FIGS. 4a and 4b are shown the output voltage wave forms of oscillator 57 and inverter 59, respectively. It will be seen that the output from oscillator 57 directly clocks the latches 64 and 65 and inverter 59 is effective for only brief period 80 to energize the tank circuit. Shift register 63 is also reset by signal 80. In FIG. 4c are shown examples of oscillation decay rates as band 11 is moved transversely farther into the gap of core 32 during operation. In cycle 81, the band is far enough away from core 32 to be ineffective; in other words, the decay rate is not influenced or damped by the position of the band. In cycles 82–84, the band is positioned progressively farther into the core gap, having correspondingly greater eddy currents induced therein, such that in cycle 84 further depression of the band will have no effect on the resonance on the tank circuit. It will be noted from FIG. 4c that a negative reference voltage at terminal 47 of the comparator 46 is present during the oscillation. Because of the reference voltage only those counts shown in FIG. 4d as the output of inverter 62 will be detected as count pulses. The value of reference voltage at terminal 47 can be varied according to the particular count range desired to facilitate the sensitivity required and the noise signals experienced. The circuit of the invention can detect band position changes of approximately 0.01 mm.

It will be seen from the foregoing description that a position detection circuit has been described which is able to provide reliable measure for determining proximity of an element and that component values are not critical. The capacitor 44 should have a low loss such as mica or polystyrene, etc. The absolute capacitance value is not critical. In addition, the accumulation of debris or the change of location of the band between one pole face and the other is not critical.

While the invention has been particularly shown and described with reference to a preferred embodiment thereof, it will be understood by those skilled in the art that the foregoing and other changes in form and detail may be made therein without departing from the spirit and scope of the invention.

We claim:

1. Apparatus for sensing the position of an electrically conductive element comprising:
   electrical circuit means energizable to create a decaying series of oscillations therein including magnetic transducer means for creating a magnetic field within which said element can move, said element having eddy currents induced therein and varying the rate of decay of said oscillations according to the position of said element within said field;
   means operatively connected to said electrical circuit means for periodically energizing said circuit means; and
   means operatively connected to said electrical circuit means for counting the oscillations of said circuit means that exceed a predetermined threshold value following each said energization with said count being an indication of the position of said element.

2. Apparatus as described in claim 1 wherein said magnetic transducer means includes a pair of windings in series on opposite sides of an opening and being energizable for producing said magnetic field across said opening to induce said eddy currents in said element.

3. Apparatus as described in claim 2 wherein said element is an endless band.

4. Apparatus as described in claim 1 further including means responsive to predetermined ones of said counts for changing the position of said element in said field.

5. Apparatus as described in claim 1 wherein said means for counting said oscillations includes a comparing means for detecting those oscillations exceeding said predetermined threshold value.

6. Apparatus as described in claim 1 wherein said electrical circuit means includes a capacitor in parallel with said transducer to form a resonant oscillatory circuit.

7. Apparatus as described in claim 1 wherein said means for periodically energizing said circuit means includes an oscillator circuit.

8. The method of sensing the position of a conductive element comprising the steps of:
   moving said element within the magnetic field of a transducer combined with a capacitor to form an oscillating tank circuit when energized;
   periodically energizing said tank circuit to produce a series of oscillations damped at a rate dependent on the position of said element in said magnetic field; and counting the voltage oscillations that exceed a predetermined threshold value following each said energization as an indication of the position of said element.

9. The method as described in claim 8 further including the step of using said count value to effect a change in the position of said element when said count reaches predetermined values.

10. Apparatus as described in claim 3 wherein said element is an endless type band movable relative to a print line and within said magnetic field produced by said magnetic transducer means, said apparatus including means responsive to predetermined ones of said counts for changing the position of said type band relative to said print line.

11. Apparatus as described in claim 10 wherein said means for changing the position of said type band further includes means to define a window at which said type band is properly positioned relative to said print line.

12. Apparatus as described in claim 11 wherein said means for defining said window is settable for to give a range of control over the position of said type band.

13. Apparatus as described in claim 11 in which said means for counting said oscillations is a count accumulator presettable to predetermined base count values to change the position of said type band.

14. Apparatus as described in claim 7 including means responsive to said oscillator circuit for periodically clearing said means for counting said oscillations that exceed said predetermined threshold value.

* * * * *